(12) United States Patent
Bhattacharjee et al.

(10) Patent No.: US 7,293,638 B2
(45) Date of Patent: Nov. 13, 2007

(54) ORIENTATION UNIT FOR A FRUIT SORTING AND GRADING MACHINE

(75) Inventors: Partha Bhattacharjee, Durgapur (IN); Anjali Chatterjee, Durgapur (IN); Rajesh Wasudeorao Lanjewar, Durgapur (IN); Umesh Shrikrishna Patkar, Durgapur (IN); Narayan Prasad Mukherjee, Durgapur (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/457,953

(22) Filed: Jul. 17, 2006

(65) Prior Publication Data

US 2007/0062784 A1 Mar. 22, 2007

(30) Foreign Application Priority Data

Aug. 5, 2005 (IN) ................................. 2088/2005

(51) Int. Cl.
*B65G 47/00* (2006.01)
(52) U.S. Cl. ..................................................... 198/387
(58) Field of Classification Search ................ 198/385, 198/387, 390
See application file for complete search history.

(56) References Cited

U.S. PATENT DOCUMENTS

| | | | | |
|---|---|---|---|---|
| 2,853,108 A * | 9/1958 | Hait | ............................ | 99/485 |
| 2,909,270 A * | 10/1959 | Hait | ............................ | 198/384 |
| 3,575,292 A * | 4/1971 | Roda | ............................ | 209/617 |
| 4,169,528 A * | 10/1979 | Amstad | ............................ | 198/385 |
| 4,221,297 A | 9/1980 | Aranda Lopez et al. | | |
| 4,687,107 A | 8/1987 | Brown et al. | | |
| 4,730,719 A * | 3/1988 | Brown et al. | ................ | 198/387 |
| 4,981,205 A * | 1/1991 | Cowlin | ........................ | 198/387 |
| 5,101,982 A * | 4/1992 | Gentili | ........................ | 209/556 |
| 5,197,585 A * | 3/1993 | Blood | .......................... | 198/384 |
| 5,267,654 A * | 12/1993 | Leverett | ...................... | 209/538 |
| 5,477,955 A * | 12/1995 | Madden et al. | ......... | 198/370.04 |
| 5,855,270 A * | 1/1999 | Throop et al. | .............. | 198/394 |
| 5,904,236 A * | 5/1999 | Affeldt et al. | ............ | 198/464.4 |
| 6,079,542 A | 6/2000 | Blood | | |
| 6,105,270 A * | 8/2000 | Capetta et al. | ................. | 33/645 |
| 6,148,989 A * | 11/2000 | Ecker | .......................... | 198/387 |
| 6,374,983 B1 * | 4/2002 | Morigi | ................... | 198/370.07 |
| 6,691,854 B1 * | 2/2004 | De Greef | ..................... | 198/395 |
| 7,222,715 B2 * | 5/2007 | Madden et al. | ......... | 198/370.04 |

* cited by examiner

*Primary Examiner*—Douglas A Hess
(74) *Attorney, Agent, or Firm*—Greenlee, Winner, and Sullivan, P.C.

(57) ABSTRACT

The present invention relates to an orientation unit for a fruit sorting and grading machine, for rolling apples around their major axes at a fixed rpm depending upon the imaging and processing speed so as to make it possible for the camera to scan the entire periphery of each apple. This orientation unit of the present invention consists of a pair of rollers, wherein each of the rollers has a conical profile on one side and a flat laminar surface on the other side to orient an apple of any shape with its major axis aligned along the axis of rotation. This set of rollers is spring loaded to make it possible for the rollers move to and fro to accommodate apples of size ranging from 60 mm to 100 mm. A rotating belt is provided underneath the rollers to rotate the fruits at a desired rpm so that a camera with an image processing system can scan the entire periphery of the fruit, including the size and shape, and surface bruises, and grade them into multiple categories in terms of quality.

6 Claims, 5 Drawing Sheets

MINOR AXIS=68 MM
MAJOR AXIS=90 MM

MINOR AXIS=90 MM
MAJOR AXIS=106 MM

ORIENTATION UNIT FOR A FRUIT SORTING AND GRADING MACHINE

CROSS-REFERENCE TO RELATED APPLICATIONS

This application claims priority to Indian Patent Application No. 2088/DEL/2005 filed on Aug. 5, 2005.

BACKGROUND

Prior art reference may be made to U.S. Pat. No. 4,221,297, titled: "Electronic fruit grading machines," wherein is described an electronic fruit grading machine consisting of an endless chain having positioning rollers or bars which rotate and on which the fruit coming from a hopper is positioned in rows. The grading machine includes an electronic apparatus capable of detecting surface marks or defects in the fruit which is situated on the bars. The fruit is arranged in transverse rows and is displaced at a certain speed under a standard television camera. The feed of the fruit from the hopper to the endless chain is carried out by a cylindrical drum acting as a feeding device. On the surface of the cylindrical drum are rows of holes, and adjacent each hole is provided a wedge, one face of which follows the prolongation of a radius of the cylindrical drum and is arranged for the expulsion of extra fruit adhered to the periphery of the cylindrical drum.

The drawback of this machine of U.S. Pat. No. 4,221,297, is that the grading is done only in two categories namely, accepted or rejected. Its inspection system is not meticulous enough to grade them in more than two categories.

Reference may also be made to U.S. Pat. No. 4,687,107, wherein a machine titled: 'Apparatus for sizing and sorting of articles' has been described. This apparatus sorts articles according to any combination of plural criteria, including volume or diameter, length, shape, weight, color, density and surface quality. A light sensitive dynamic random access memory and novel processing circuitry are utilized for providing indications of the article's volume, diameter and length.

The drawback in this machine of U.S. Pat. No. 4,687,107, is that complete surface inspection like looking for possible bruises etc. is not done and the fruits are carried by rollers, where the color sensor and the surface inspector sees a part of the surface, on which the operator has no control. This way, if the fruit is not oriented properly, the machine may end up seeing the stem part of the fruit, on the basis of such vision a fruit cannot be judged.

A further prior art reference may be made to U.S. Pat. No. 6,079,542, titled: 'Object sorter and sizer' wherein an apparatus and methods for sorting objects such as fruits, by categories, such as size, shape, weight and color have been described. The object sorting system includes a product presentation device with a floating portion and a subframe pivotally connected to a frame link driven by a chain. The product presentation device and frame link operate with a latch so that the product presentation device can move objects through the system to be sorted and deposit the objects at an appropriate job station. The floating portion of the product presentation device allows accurate determination of object weights. The product presentation device can also be married to or divorced from wheels which are used to turn the object before a viewer for sorting based on visual characteristics. Because the wheels can be divorced from the product presentation device, objects can be deposited more gently in collection bins at the drop stations. The system may use belt driven or roller driven pre-singulation to assure that only one object is placed in a product presentation device. The system has independently driven chain drives for the wheels and the product presentation devices. Chain phasing is employed on either the chain drive for the wheels or the product presentation device to maintain appropriate spacing between the wheels and the product presentation device, thereby reducing wear and tear on the system and its components.

The major drawback of the above said U.S. Pat. No. 6,079,542, titled: 'Object sorter and sizer' is that this machine rotates but does not orient the fruit which results in taking photographs of unwanted parts of the fruit, thereby increasing the load and cost of image processing.

As a consequence to the hitherto known prior art as described herein above, it is clear that there is a definite need for providing an orientation unit for fruit sorting and grading machines which will enable image sensing in a favorable manner.

SUMMARY OF THE INVENTION

The present invention relates to an orientation unit for fruit sorting and grading machine. The present invention particularly relates to an orientation unit which orients the fruits in an automatic fruit sorting and grading machine wherein the sorting and grading is done principally by photographing the entire surface of the fruit and subsequently by processing the image. The orientation unit of the present invention has been particularly developed for achieving sorting and grading of apples.

In a fruit sorting and grading machine wherein the sorting and grading is done principally by photographing the entire surface of the fruit by a stationery camera, it is necessary to rotate the fruit at a fixed rpm, keeping it within the viewing angle of the camera. The orientation unit of the present invention orients the fruits such as apple, favorable for photographing the required surface area for further sorting and grading in multiple categories. This orientation unit of the present invention can also be used along with the sorting and grading machines of other citrus fruits such as orange, lemon and sweet lemon.

The main object of the present invention is to provide an orientation unit for fruit sorting and grading machine, which obviates the drawbacks of the hitherto known prior art as detailed above.

Another object of the present invention is to provide an orientation unit for fruit sorting and grading machine to facilitate automatic grading and sorting of apples and other round shaped fruits, in a non destructive method.

Yet another object of the present invention is to provide an orientation unit for fruit sorting and grading machine, which will be simple and economical compared to other existing machines where robotic arms are used.

Still another object of the present invention is to provide an orientation unit for fruit sorting and grading machine where human error is not introduced.

A further object of the present invention is to provide an orientation unit for fruit sorting and grading machine, which will enhance productivity.

A still further object of the present invention is to provide an orientation unit for fruit sorting and grading machine, which will enable rolling the round fruits, such as apples around its major axis at a fixed rpm, depending upon the imaging and processing speed so as to make it possible for the camera to scan the entire periphery of the apple.

DETAILED DESCRIPTION

In the present invention there is provided an orientation unit for fruit sorting and grading machine, for rolling apples around its major axis at a fixed rpm depending upon the imaging and processing speed so as to make it possible for the camera to scan the entire periphery of the apple. This orientation unit of the present invention consists of a pair of rollers, wherein each of the rollers having a conical profile on one side and a flat laminar surface on the other side to get an apple of any shape oriented with major axis aligned along the axis of rotation. This set of rollers being spring loaded to make it possible for the rollers move to and fro to accommodate apples of size ranging from 60 mm to 100 mm. A rotating belt being provided underneath the said rollers to rotate the fruits at a desired rpm so that a camera with an image processing system can scan the entire periphery of the fruit, the size and shape of, surface bruise and grade them into multiple category in terms of quality.

The orientation unit of the present invention for fruit sorting and grading machine, is illustrated in FIGS. 1 to 5 of the drawings accompanying this specification.

Figure 1:
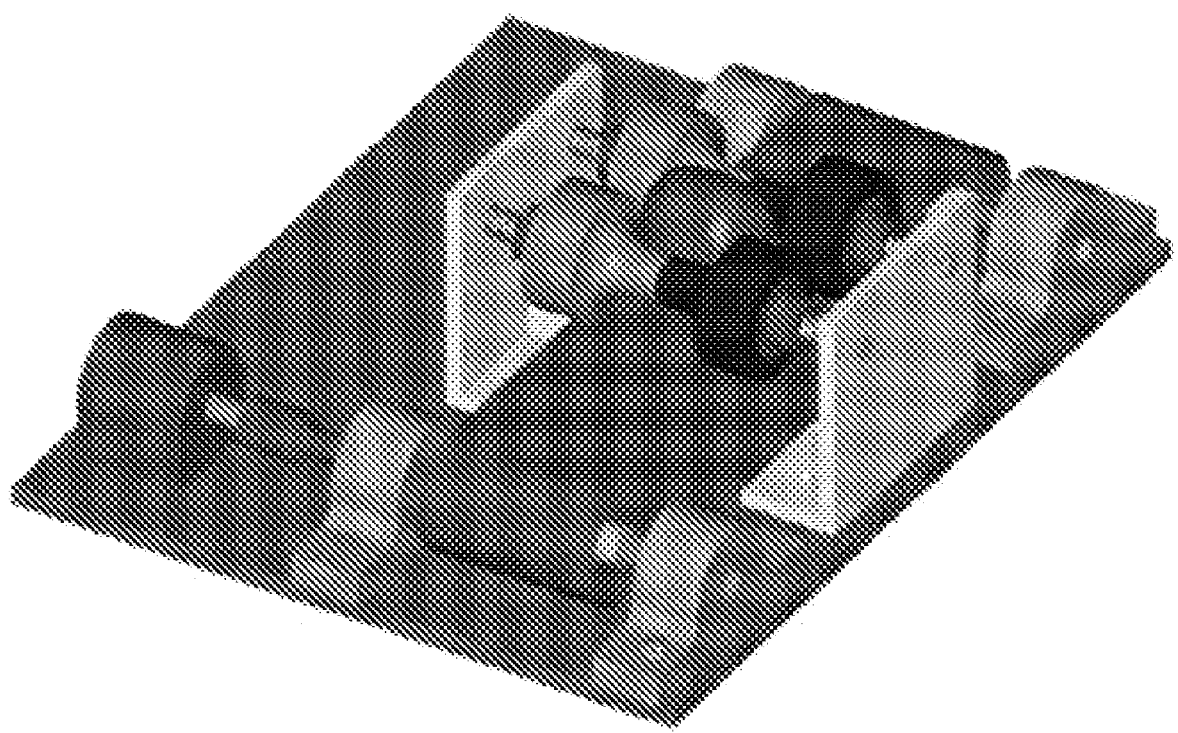
FIG. 1 is a three-dimensional view of the orientation unit of this invention.

FIG. 1 depicts a 3-dimensional view of a prototype of the orientation unit of the present invention.

Figure 2:
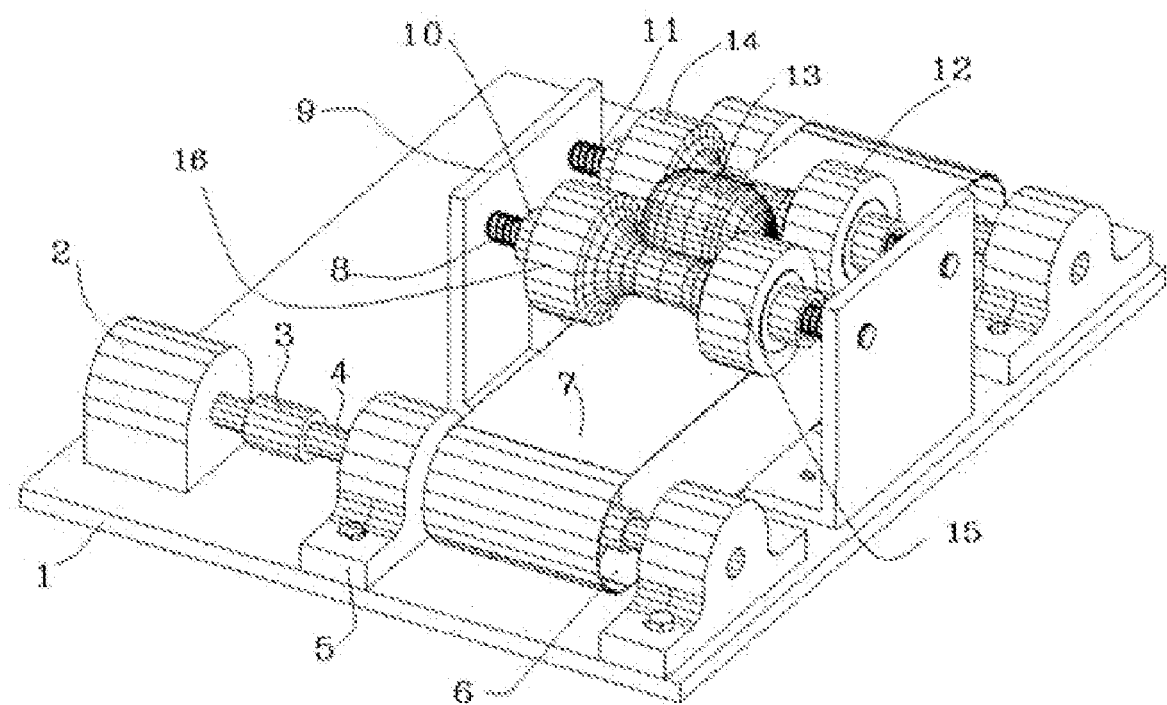
FIG. 2 is a side isometric view of the orientation unit of this invention.

FIG. 2 represents a side isometric view of the prototype of the orientation unit of the present invention. In this figure part no. 1 is a base plate (1) on which the orientation system is mounted. No. 2 is a variable speed motor (2). No. 3 is a coupler between the motor (2) and a shaft (4) connected to the drum (6) rotating the belt (7). No. 4 is a shaft to transmit the motor (2) rotation to the drum (6) rotating the belt (7), No. 5 is the guide for the shaft (4). No. 8 and 11 are the springs for allowing the rollers to move axially to accommodate apples of varying size. No. 14 and 16 are conical rollers with inner edge of elliptical shape. No. 12 and 15 are cylindrical rollers with inner edge having flat laminar surface; and No. 13 is an apple to be oriented.

The variable speed motor (2) is capable of driving a belt (7) mounted on a horizontal drum (6) through a coupler (3) and a shaft (4). The rotation of the motor (2) is transmitted up to the fruit (13) through belt (7) which in turn drives a set of two pairs (12,14 & 15,16) of spring (8,11) loaded freely rotatable rollers (12,14 & 15,16) on horizontal shafts (10) mounted on vertical supports (9).

Figure 3:
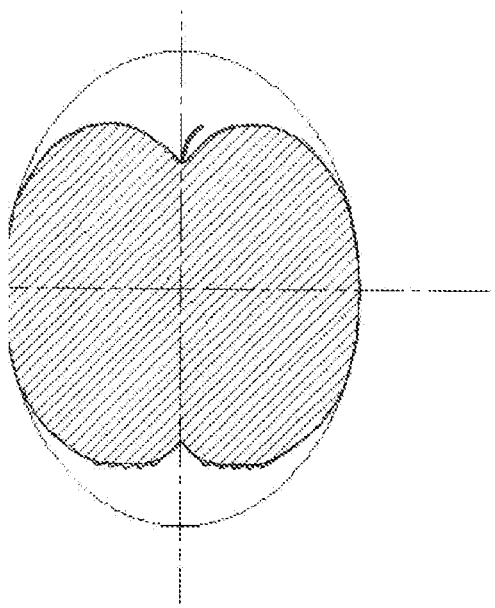
FIG. 3 is a cross-sectional view of an apple showing how the major axis of the encircling ellipsoidal always passes through the stem.
Figure 4:
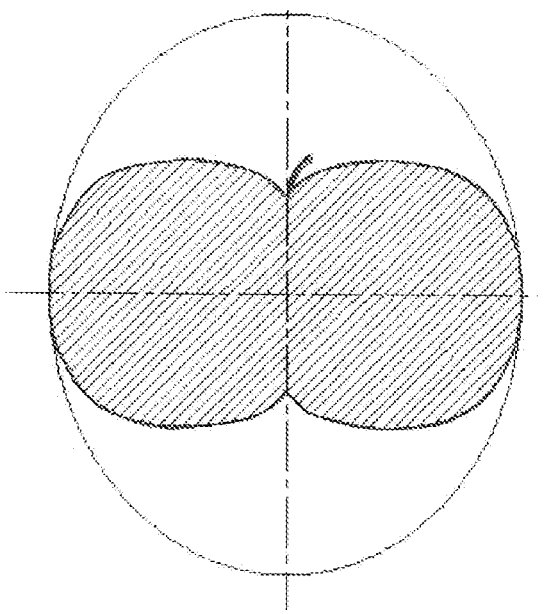
FIG. 4 is a cross-sectional view of an apple having a different shape from the apple shown in FIG. 3, also showing the major axis of the encircling ellipsoidal passing through the stem.
Figure 5:
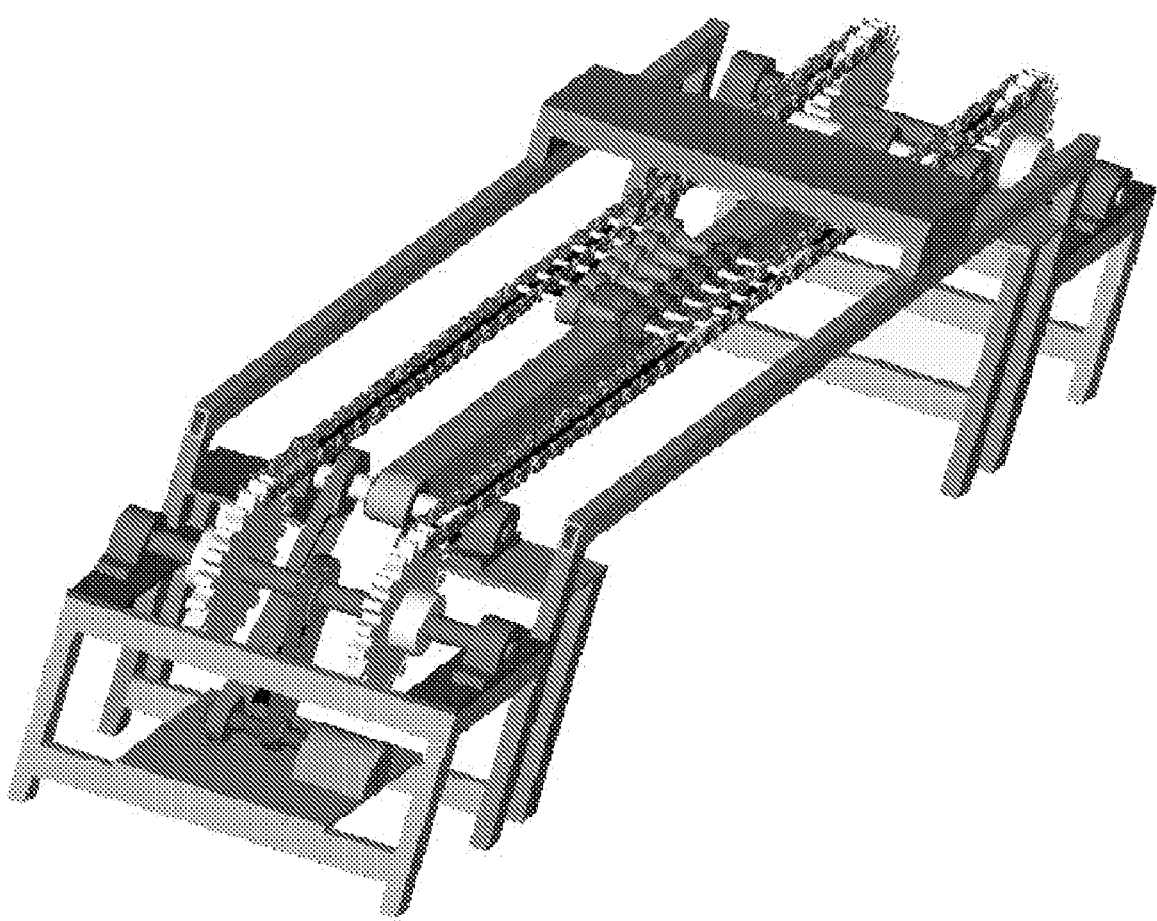
FIG. 5 shows a view of the complete orientation conveyor populated with a few orientation units of this invention.

FIGS. 3 and 4 shows the cross-section of two apples of different shapes and illustrates how the major axis of the encircling ellipsoidal always passes through the stem.

Accordingly the present invention provides an orientation unit for fruit sorting and grading machine, which comprises a proximally placed set of two pairs (12,14 & 15,16) of spring (8,11) loaded freely rotatable rollers on horizontal shafts (10) mounted on vertical supports (9); each of the said pair of rollers (12,14 & 15,16) consisting of a conical (14,16) and cylindrical (12,15) rollers, wherein the inside edge of the conical rollers (14,16) of each of the said pair of rollers (12,14 & 15,16) having an elliptical profile (14,16) and the inside edge of the cylindrical rollers (12,15) of each of the said pair of rollers (12,14 & 15,16) having a flat laminar surface (12,15); the said set of two pairs of rollers (12,14 & 15,16) being provided with direct underneath contact with a variable speed horizontally moving endless belt (7).

In an embodiment of the present invention, the proximally placed set of two pairs (12,14 & 15,16) of spring loaded (8,11) freely rotatable rollers on horizontal shafts (10), consists of the conical rollers (14,16) with elliptical profile on one side and the cylindrical rollers (12,15) with flat laminar surface on the other side capable of accommodating apples of size ranging from 60 mm to 100 mm.

In another embodiment of present invention, there is provided a base plate (1) on which the entire system is mounted.

In yet another embodiment of present invention, the variable speed horizontally moving endless belt (7) is mounted on a horizontal rotatable drum (6) powered by a variable speed motor (2) through a coupler (3) and shaft (4) having guides (5).

In still another embodiment of the present invention, the springs (8 & 11) of the spring (8,11) loaded freely rotatable pair of rollers (12,14 & 15,16) on horizontal shafts (10) are placed between the vertical supports (9) and the outer edge of the rollers.

In a further embodiment of the present invention, the surface of the rollers are provided with soft sponge cushioning against sharp edges and covered with blue acrylic cloth.

In the orientation unit of the present invention for fruit sorting and grading machine, there is provided a set of two rollers with conical profile on one side and two more rollers with flat laminar surface on the other side to get an apple of any shape oriented with major axis aligned along the axis of rotation. The set of four rollers are provided with a set of four springs of calculated spring constant to make it possible for the rollers move to and fro to on the horizontal shaft to accommodate apples of size ranging from 60 mm to 100 mm. The set of four rollers are provided with a variable speed endless belt underneath the rollers to rotate the fruits at a desired rpm so that a camera with an image processing system can scan the entire periphery of the fruit, the size and shape of, surface bruise and grade them into multiple category in terms of quality. This enables the present invention is to provide an orientation unit for rolling apples around its major axis at a fixed rpm depending upon the imaging and processing speed so as to make it possible for the camera to scan the entire periphery of the apples.

The present invention of orientation unit facilitates the automatic sorting and grading of fruits. The method adopted for fruit sorting, is principally by processing the camera image of the individual fruit. From the camera image a computer does the grading depending on the color, size, surface bruises and brown spots. The brown color of the stem and the dark patch around the stem is not considered in the grading process. For this reason the fruits are oriented with the major axis vertical to the camera so as to avoid the appearance of the stem and its opposite side in the image. Thus orientation of the fruits plays an important role in sorting and grading of them in the present process. In this process it is also required to roll the apple around its major axis at a fixed rpm (depending on the imaging and processing speed) so that the images of the outer surface of the apple can be captured at six different angles spacing 60 degree apart to cover the entire periphery (360 degree) of the apple.

Novelty of the orientation unit of the present invention for fruit sorting and grading machine lies in the ability of the device to orient the apples in such a way that only the desired portion of the surface of the apples is exposed for image processing and further sorting. The orientation unit of the present invention enables apples of various sizes to be oriented and rotated at any desired speed for scanning by a camera of the entire periphery of an apple.

The novelty in this invention has been achieved by the non-obvious inventive step of application of gyration principle to orient the apples through non-obvious constructional features such as proximally placing a set of two pairs of spring loaded freely rotatable rollers on horizontal shafts mounted on vertical supports, wherein each of the said pair of rollers consists of a conical and cylindrical rollers. The inside edge of the conical rollers having an elliptical profile and the inside edge of the cylindrical rollers having a flat laminar surface. The said set of two pairs of rollers being provided with direct underneath contact with a variable speed horizontally moving endless belt.

The orientation unit of the present invention for fruit sorting and grading machine, is based on the gyration principle. From the cross section, along the major axis of an apple it is found to be of almost elliptical shape, where some of the mass from two tips being absent. As a result more mass is on the periphery side and less mass on the stem and bottom side. The line joining the stem and the bottom part of it makes the major axis of the ellipsoidal, as is shown in FIGS. 3 and 4 of the drawings. So if it is rotated, at some speed the apple will orient itself in such a direction as to get the major axis along the axis of rotation, as it happens in case of a top (toy). But in the orientation unit of the present invention, unlike a top, it cannot rotate in air, nor it can rotate on a peg. For that a special arrangement has been made, which is the non-obvious inventive step of providing a set of two cylindrical and two conical rollers as is shown in FIGS. 1 and 2 of the drawings. The inside edges of the conical and cylindrical rollers touching the apple to be oriented, have an elliptical profile and a flat laminar surface, respectively. Underneath the rollers there is a belt moving at high speed capable of rotating all the four rollers through direct contact. After trying out a number of profiles it was seen that with conical profile on one side and flat laminar profile on the other end if the apple is rotated, at around 600 rpm the apple gets oriented. Light springs (part no. 11 and 8 in FIG. 2) are placed between fixed clamp and the end of the rollers, so that during rotation rollers can move along the axis of rotation to adjust themselves to the profile of the apple. It has also been observed that once an apple is oriented with its major axis perpendicular to the plane of rotation it continues to stay in that orientation even at lower speed of rotation. This gives an opportunity to rotate the apple at a fixed rpm, while it is traveling through the view angle of the camera. The rpm is adjusted according to the frame grabbing speed of the camera and the processing speed of the digital processor, so that during this travel of the apple the camera can take six shots at every 60 degrees of the periphery of the apple to complete the total 360 degree of the surface for online quality assessment by image processing. The surface of the rollers are covered with blue acrylic cloth having soft sponge underneath to provide cushioning and cover sharp edges. Cushioning is given to avoid any damage to the fruit and Blue color is chosen for the ease of image processing. Since apple has no (negligible if there) blue component, once the blue components are removed from the image, it becomes easy to detect the edge.

EXAMPLES

The following examples are given by way of illustration of actual working of the orientation unit of the present invention for fruit sorting and grading machine, in actual practice and therefore should not be construed to limit the scope of present invention.

Example 1

Figure 6:
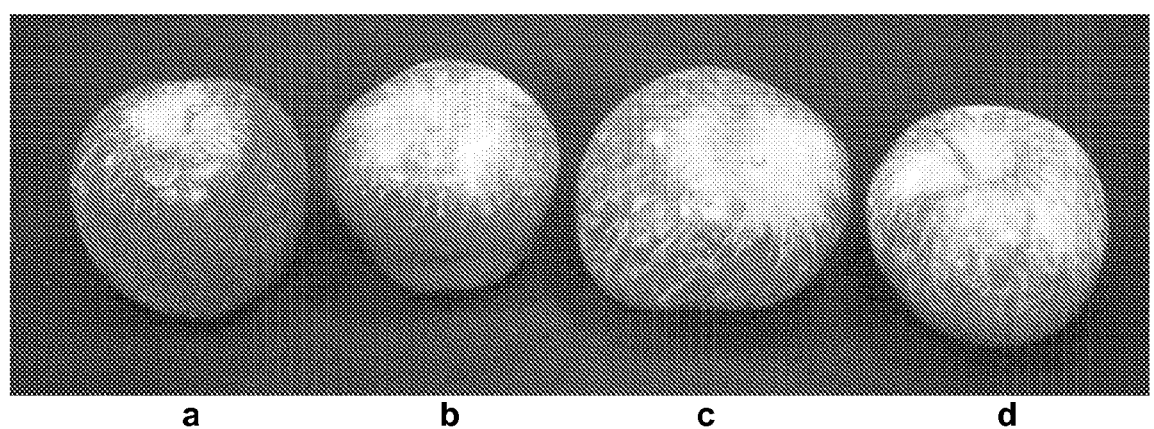
FIGS. 6(a), (b), (c) and (d) show apples of different shapes which have been used for experimentation.

An experiment for orienting an apple as depicted in FIG. 6 (*a*) was carried out using a prototype of the orientation unit of the present invention, as shown in FIGS. 1 and 2 of the drawings. The belt speed was 600 rpm. The time required to get the apple, as shown in FIG. 6(*a*), oriented was 0.5 second at a belt speed of 600 rpm.

Example 2

An experiment for orienting an apple as depicted in FIG. 6 (*b*) was carried out using a prototype of the orientation unit of the present invention, as shown in FIGS. 1 and 2 of the drawings. The belt speed was 600 rpm. The time required to get then apple, as shown in FIG. 6(*b*), oriented was 3 seconds at a belt speed of 600 rpm.

Example 3

An experiment for orienting an apple as depicted in FIG. 6 (*c*) was carried out using a prototype of the orientation unit of the present invention, as shown in FIGS. 1 and 2 of the drawings. The belt speed was 600 rpm. The time required to get the apple, as shown in FIG. 6(*c*), oriented was 5 seconds at a belt speed of 600 rpm.

Example 4

An experiment for orienting an apple as depicted in FIG. 6 (*d*) was carried out using a prototype of the orientation unit of the present invention, as shown in FIGS. 1 and 2 of the drawings. The belt speed was 600 rpm. The time required to get the apple, as shown in FIG. 6(*d*), oriented was 1 second at a belt speed of 600 rpm.

The main advantages of the orientation unit of the present invention for fruit sorting and grading machine, present invention are:

1. Provides a simple and economical machine as compared to other existing machines where robotic arms are used.
2. Avoids human error in fruit sorting and grading.
3. Will facilitate automatic grading and sorting of apple in a non-destructive manner.

4. Will enhance productivity for fruit sorting and grading.
5. Will also increase export of apple as it can process large volumes in short time and facilitates quality assessment as per export requirements.

The invention claimed is:

1. An orientation unit for a fruit sorting and grading machine, which comprises a proximally placed set of two pairs (12,14 & 15,16) of spring (8,11) loaded freely rotatable rollers on horizontal shafts (10) mounted on vertical supports (9); each of the said pair of rollers (12,14 & 15,16) consisting of a conical (14,16) and cylindrical (12,15) rollers, wherein the inside edge of the conical rollers (14,16) of each of the said pair of rollers (12,14 & 15,16) having an elliptical profile (14,16) and the inside edge of the cylindrical rollers (12,15) of each of the said pair of rollers (12,14 & 15,16) having a flat laminar surface (12,15); the said set of two pairs of rollers (12,14 & 15,16) being provided with direct underneath contact with a variable speed horizontally moving endless belt (7).

2. An orientation unit for a fruit sorting and grading machine according to claim 1, wherein the proximally placed set of two pairs (12,14 & 15,16) of spring loaded (8,11) freely rotatable rollers on horizontal shafts (10), consists of the conical rollers (14,16) with elliptical profile on one side and the cylindrical rollers (12,15) with flat laminar surface on the other side capable of accommodating apples of size ranging from 60 mm to 100 mm.

3. An orientation unit for a fruit sorting and grading machine according to claim 1, wherein a base plate (1) is provided on which the entire system is mounted.

4. An orientation unit for a fruit sorting and grading machine according to claim 1, wherein the variable speed horizontally moving endless belt (7) is mounted on a horizontal rotatable drum (6) powered by a variable speed motor (2) through a coupler (3) and shaft (4) having guides (5).

5. An orientation unit for a fruit sorting and grading machine according to claim 1, wherein the springs (8 & 11) of the spring (8,11) loaded freely rotatable pair of rollers (12,14 & 15,16) on horizontal shafts (10) are placed between the vertical supports (9) and outer edge of the rollers.

6. An orientation unit for a fruit sorting and grading machine according to claim 1, wherein surfaces of the rollers are provided with soft sponge cushioning against sharp edges and covered with blue acrylic cloth.

* * * * *